United States Patent
Isensee et al.

(10) Patent No.: US 7,111,236 B1
(45) Date of Patent: Sep. 19, 2006

(54) METHOD AND APPARATUS FOR VISUALLY INDICATING THE LOCATION OF LINKS WITHIN A WEB PAGE

(75) Inventors: Scott Harlan Isensee, Georgetown, TX (US); Roger Dale Tilson, Austin, TX (US); Richard Edmond Berry, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1647 days.

(21) Appl. No.: 08/974,413

(22) Filed: Nov. 19, 1997

(51) Int. Cl.
*G06F 17/00* (2006.01)
(52) U.S. Cl. .............. 715/528; 715/529; 715/517; 715/526
(58) Field of Classification Search ............ 707/800, 707/1–530; 340/57, 825.01–827; 345/302–427; 715/526–529, 517, 530, 524–525
See application file for complete search history.

(56) References Cited

U.S. PATENT DOCUMENTS 5,528,735 A * 6/1996 Strasnick et al. .......... 345/427
5,764,916 A * 6/1998 Busey et al. ............... 707/513
5,854,902 A * 12/1998 Wilson et al. ............. 340/541
5,861,885 A * 1/1999 Strasnick et al. .......... 345/355
6,486,895 B1 * 11/2002 Robertson et al. ......... 715/738

OTHER PUBLICATIONS

A Web-based retrieval system for 3D polygonal models, M. T.; IFSA World Congress and 20th NAFIPS International Conference, 2001. Joint 9th vol. 4, Jul. 25-28, 2001 pp. :2271-2275 vol. 4.*
The display of photographic-quality images on the Web: a comparison of two technologies; Jao, C. S.; Hier, D. B.; Brint, S. U.; Information Technology in Biomedicine, IEEE Transactions on vol 3, Issue 1, Mar. 1999 pp.:70-73.*
Content-based transcoding of images in the Internet; Smith, J. R.; Mohan, R.; Chung-Sheng Li; Image Processing, 1998. ICIP 98. Proceedings. 1998 International Conference on Oct. 4-7, 1998 pp.: 7-11 vol. 3.*

* cited by examiner

*Primary Examiner*—David Jung
(74) *Attorney, Agent, or Firm*—Andrea Pair Bryant; Richard A. Henkler; Mark S. Walker

(57) ABSTRACT

A method and apparatus for visually indicating whether a hyper-link located in a web page is linked within the current page, other pages within the same site, pages external to the current site, links that open a new browser, links that alter the content of the browser, or lines that have slow connection rates. The visual indication is either indicated by the hyper-link itself and/or a corresponding visual indicator.

4 Claims, 5 Drawing Sheets

METHOD AND APPARATUS FOR VISUALLY INDICATING THE LOCATION OF LINKS WITHIN A WEB PAGE

BACKGROUND

1. Field of the Present Invention

The present invention generally relates to computer systems, and more particularly, to methods and apparatuses which visually indicate the location of links within a web page.

2. Description of the Related Art

The development of computerized distributed information resources, such as the "Internet", allows users to link with servers and networks, and retrieve vast amounts of electronic information that was previously unavailable using conventional electronic mediums. Such electronic information increasingly is displacing more conventional techniques of information transmission, such as newspapers, magazines, and even television.

The term "Internet" is an abbreviation for "Inter network", and refers commonly to a collection of computer networks that use the TCP/IP suite of protocols. TCP/IP is an acronym for "Transport Control Protocol/Interface Program", a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user.

For example, traveling among hypertext links to the word "iron" in an article displayed within a graphical user interface might lead the user to the periodic table of the chemical elements (e.g., linked by the word "iron"), or to a reference to the use of iron in weapons in Europe in the Dark Ages. The term "hypertext" is used to describe documents, as presented by a computer, that express the non-lineal structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics, rather than moving sequentially from one topic to the next, as in an alphabetic list. In other words, hypertext topics are linked in a manner that allows users to jump from one subject to other related subjects during a search for information.

Networked systems using hypertext conventions typically follow a client/server architecture. A "client" is a member of a class or group that uses the services of another class or group to which it is not related. In the context of a computer network, such as the Internet, a client is a process (i.e., roughly a program or task) that requests a service which is provided by another program. The client process uses the requested service without having to "know" any working details about the other program or the service itself In networked systems, a client is usually a computer that accesses shared network resources provided by another computer (i.e., a server).

A "server" is typically a remote computer system which is accessible over a communications medium such as the Internet. The server scans and searches for raw (e.g., unprocessed) information sources (e.g., news wire feeds or news groups). Based upon such requests by the user, the server presents filtered electronic information to the user as server responses to the client process. The client process may be active in a second computer system, and communicate with one another over a communications medium that allows multiple clients to take advantage of the information-gathering capabilities of the server.

Clients and servers communicate with one another using the functionality provided by a HyperText Transfer Protocol (HTTP). The World Wide Web (WWW) or, simply, the "web," includes all servers adhering to this protocol, which are accessible to clients via a Universal Resource Location (URL). Internet services can be accessed by specifying Universal Resource Locators that have two basic components: a protocol to be used and an object path name. For example, the Universal Resource Locator address, "http://www.uspto.gov" (i.e., the "home page" for the U.S. Patent and Trademark Office), specifies a hypertext transfer protocol ("http") and a path name of the server ("www.uspto.gov").

The server name is associated with a unique numeric value (TCP/IP address). Active within the client is a first process, known as a "browser", that establishes the connection with the server, and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page") is a data file written in a hypertext language that may have text, graphic images, and even multimedia objects such as sound recordings or move video clips associated with that data file. The web page can be displayed as a view able object within a computer system. A view able object can contain one or more components such as spreadsheets, text, hot links, pictures, sound, and video objects. A web page can be constructed by loading one or more separate files into an active directory or file structure that is then displayed as a view able object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a view able object on the workstation monitor. A web page may be "larger" than the physical size of the monitor screen, and devices such as graphical user interface scroll bars can be utilized by the viewing software (i.e., the browser) to view different portions of the web page.

Most text displayed by a web browser is formatted using standard HTML. An HTML file is a text file that contains both the text to be displayed and markup tags that describe how the text should be formatted by the web browser. The HTML markup tags support basic text formatting, such as paragraph breaks, bullet lists, tables, graphs, charts, and so forth. In addition to these basic text formatting tags, HTML provides tags defining graphical user interface components. HTML also can be used to display well known graphical user interface components such as radio buttons, check boxes, scrolling lists of selectable text, and various other such components at the web browser itself.

Unfortunately, today's web pages often fail to indicate where a particular link, located therein, will ultimately take a users more specifically, whether the link is for a location within the same site or whether it is external to the current site. This information is crucial to users who desire to browse or remain within the same site from which they began.

It would, therefore, be a distinct advantage to have a method and apparatus for indicating within a web page whether a particular link is for a page located internal or external to the site. The present invention provides such a method and apparatus.

SUMMARY OF THE PRESENT INVENTION

The present invention visually indicates whether a hyper-link located in a web page is linked within the current page, other pages within the same site, pages external to the current site, links that open a new browser, links that alter the content of the browser, or lines that have slow connection rates. The visual indication is either indicated by the hyper-link itself and/or a corresponding visual indicator.

BRIEF DESCRIPTION OF THE DRAWINGS

The present invention will be better understood and its numerous objects and advantages will become more apparent to those skilled in the art by reference to the following drawings, in conjunction with the accompanying specification, in which.

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Figure 1:
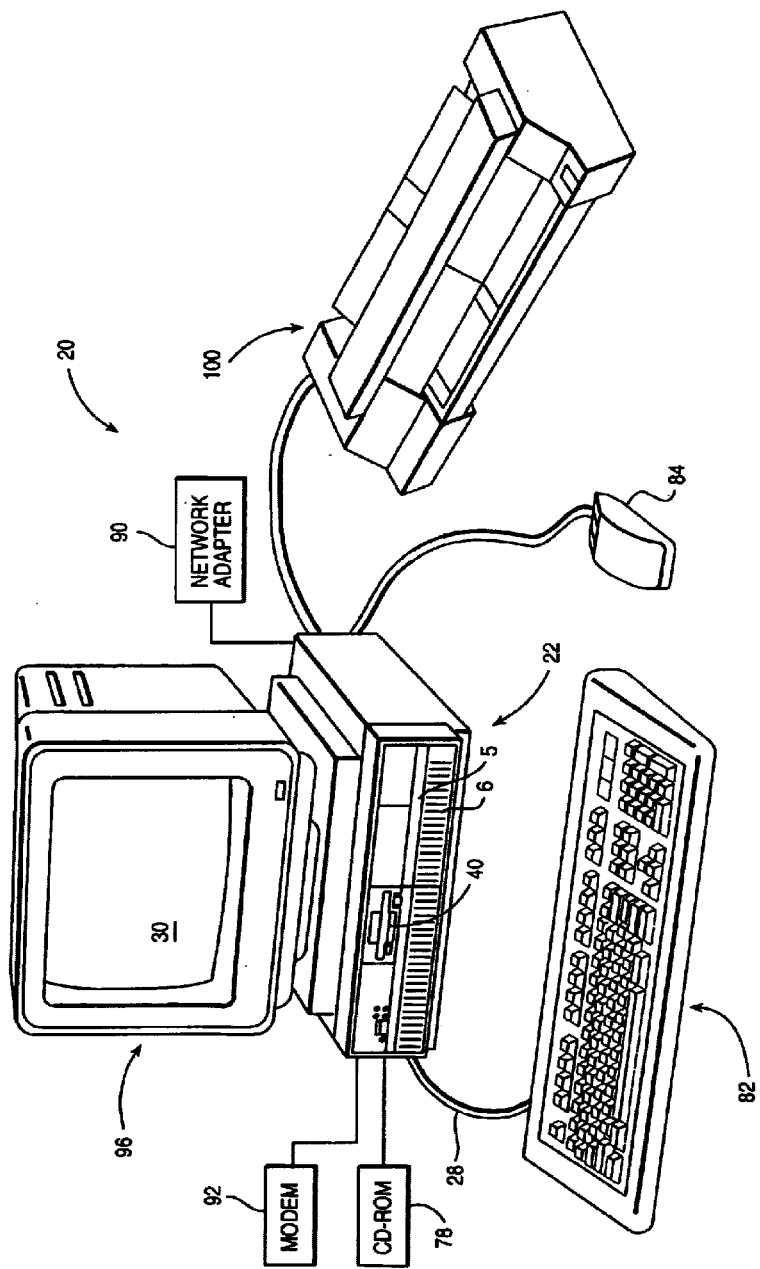
FIG. 1 is a diagram of a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
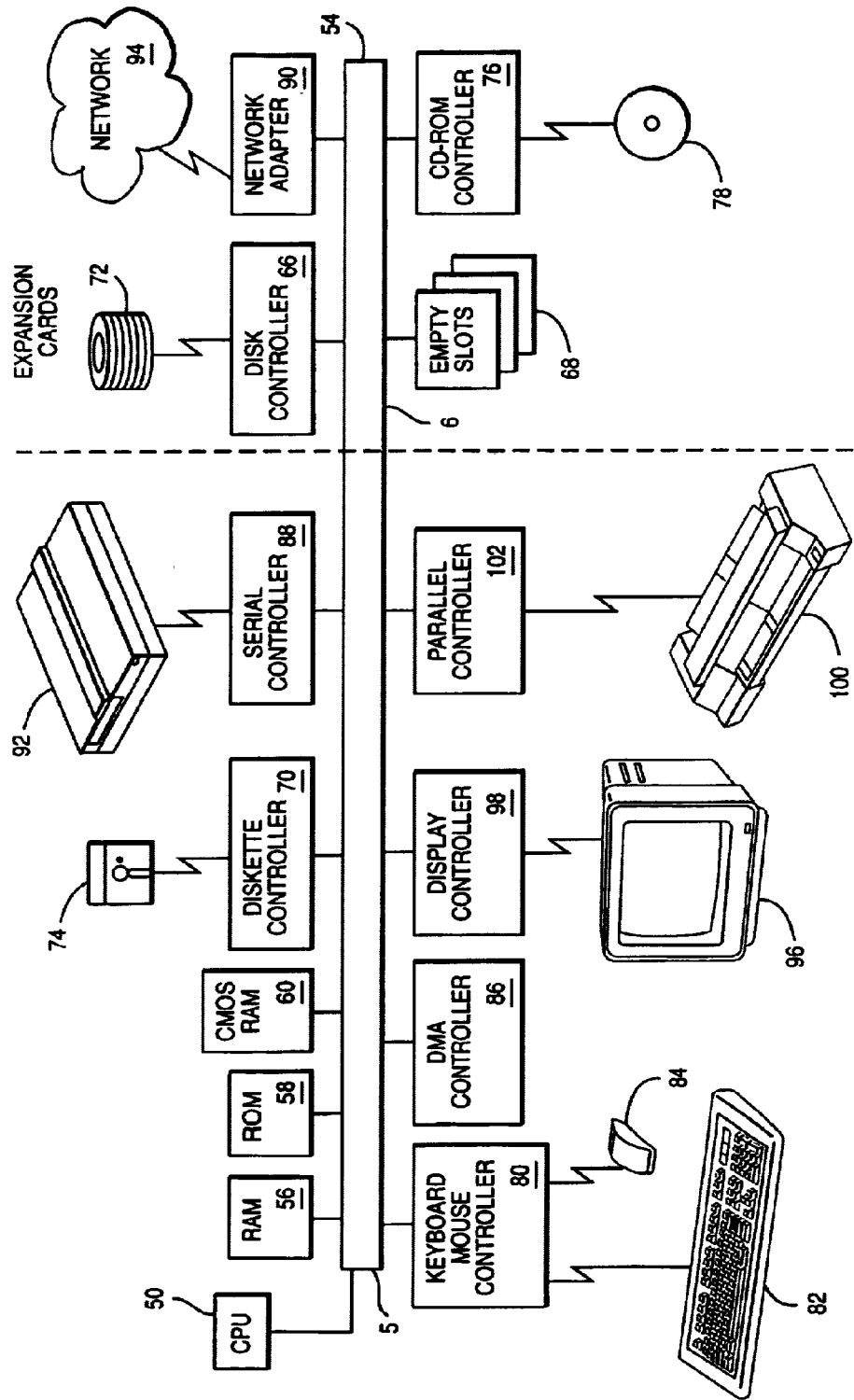
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not loose data when power is removed from it. Nonvolatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the track ball, the track pad, and the pointing device sold under the trademark "Track Point" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

Figure 3:
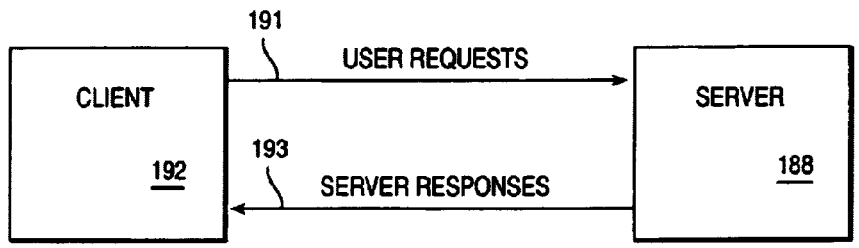
FIG. 3 illustrates a block diagram illustrative of a client/server architecture in accordance with a preferred embodiment of the present invention.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2. Reference now being made to FIG. 3, a block diagram is shown illustrating a client/server architecture in accordance with a preferred embodiment of the present invention. In FIG. 3, user requests 91 for news are sent by a client application program 92 to a server 88. Server 88 can be a remote computer system accessible over the Internet or other communication networks. Client application program 92 can be used with computer 20 of FIG. 1 and the implementation of computer 20 illustrated in FIG. 2.

Server 88 performs scanning and searching of raw (e.g., unprocessed) information sources (e.g., news wire feeds or news groups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

Figure 4:
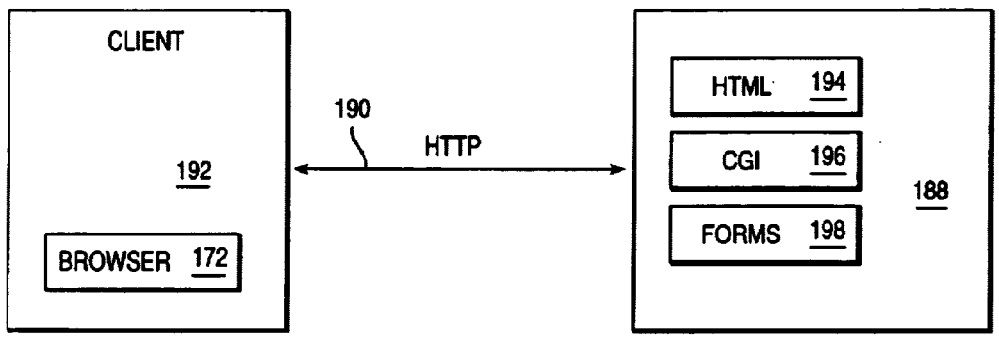
FIG. 4 depicts a detailed block diagram of a client/server architecture in accordance with a preferred embodiment of the present invention.

Reference now being made to FIG. 4, a detailed block diagram is shown of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by using the functionality provided by HTTP. Active within client 92 is a first process, browser 72, which establishes connections with server 88, and presents information to the user. Any number of commercially or publicly available browsers can be used in various implementations in accordance with the preferred embodiment of the present invention.

For example, a browser such as Netscape™ can be utilized in accordance with a preferred embodiment of the present invention to provide the functionality specified under HTTP. "Netscape" is a trademark of Netscape, Inc.

Server 88 executes the corresponding server software, which presents information to the client 92 in the form of HTTP responses 90. The HTTP responses 90 correspond with the web pages represented using HTML, or other data generated by server 88. Server 88 provides HTML 94.

Under certain browsers, a Common Gateway Interface (CGI) 96 is also provided, which allows the client program to direct server 88 to commence execution of a specified program contained within server 88. This may include a search engine that scans received information in the server 88 for presentation to the user controlling the client 92.

Using this interface, and HTTP responses 90, the server 88 can notify the client of the results of that execution upon completion.

Common Gateway Interface (CGI) 96 is one form of a gateway, a device used to connect dissimilar networks (i.e., networks using different communications protocols) so that electronic information can be passed from one network to the other. Gateways transfer electronic information, converting such information to a form compatible with the protocols used by the second network for transport and delivery.

In order to control the parameters of the execution of this server-resident process, the client 92 may direct the filling out of certain "forms" from the browser. This is provided by the "fill-in-forms" functionality (i.e., forms 98), which is provided by some browsers. This functionality allows the user via a client application program to specify terms in which the server causes an application program to function (e.g., terms or keywords contained in the types of stories/articles which are of interest to the user). This functionality is an integral part of the search engine.

Figure 5:
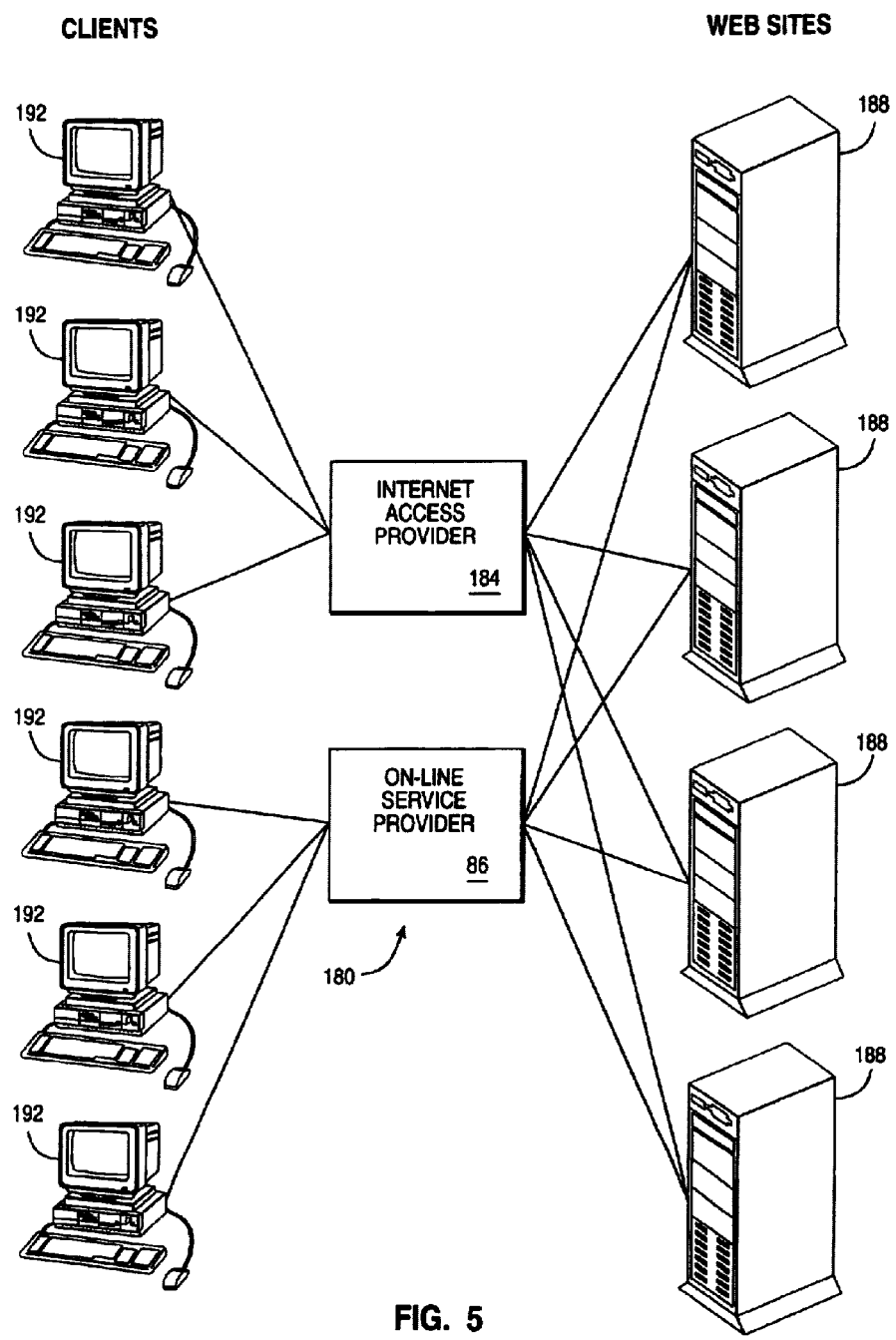
FIG. 5 is a diagram illustrative of a computer network which can be implemented in accordance with a preferred embodiment of the present invention.

Reference now being made to FIG. 5, a diagram is shown illustrating a computer network 80, which can be implemented in accordance with a preferred embodiment of the present invention. Computer network 80 is representative of the Internet, which can be described as a known computer network based on the client-server model discussed herein. Of course, those skilled in the art will appreciate that the Internet is not the only distributed computer network that may be utilized in accordance with a preferred embodiment of the present invention. Other distributed computer networks such as the so-called "intranets" well known in the art of computer networking can also be utilized to implement computer network 80.

Conceptually, the Internet includes a large network of servers 88 that are accessible by clients 92, typically users of personal computers, through some private Internet access provider 84 (e.g., such as Internet America) or an on-line service provider 86 (e.g., such as America On-line, Prodigy, CompuServe, and the like). Each of the clients 92 may run a browser to access servers 88 via the access providers. Each server 88 operates a so-called "web site" that supports files in the form of documents and pages. A network path to servers 88 is identified by a Universal Resource Locator having a known syntax for defining a network collection.

Figure 6:
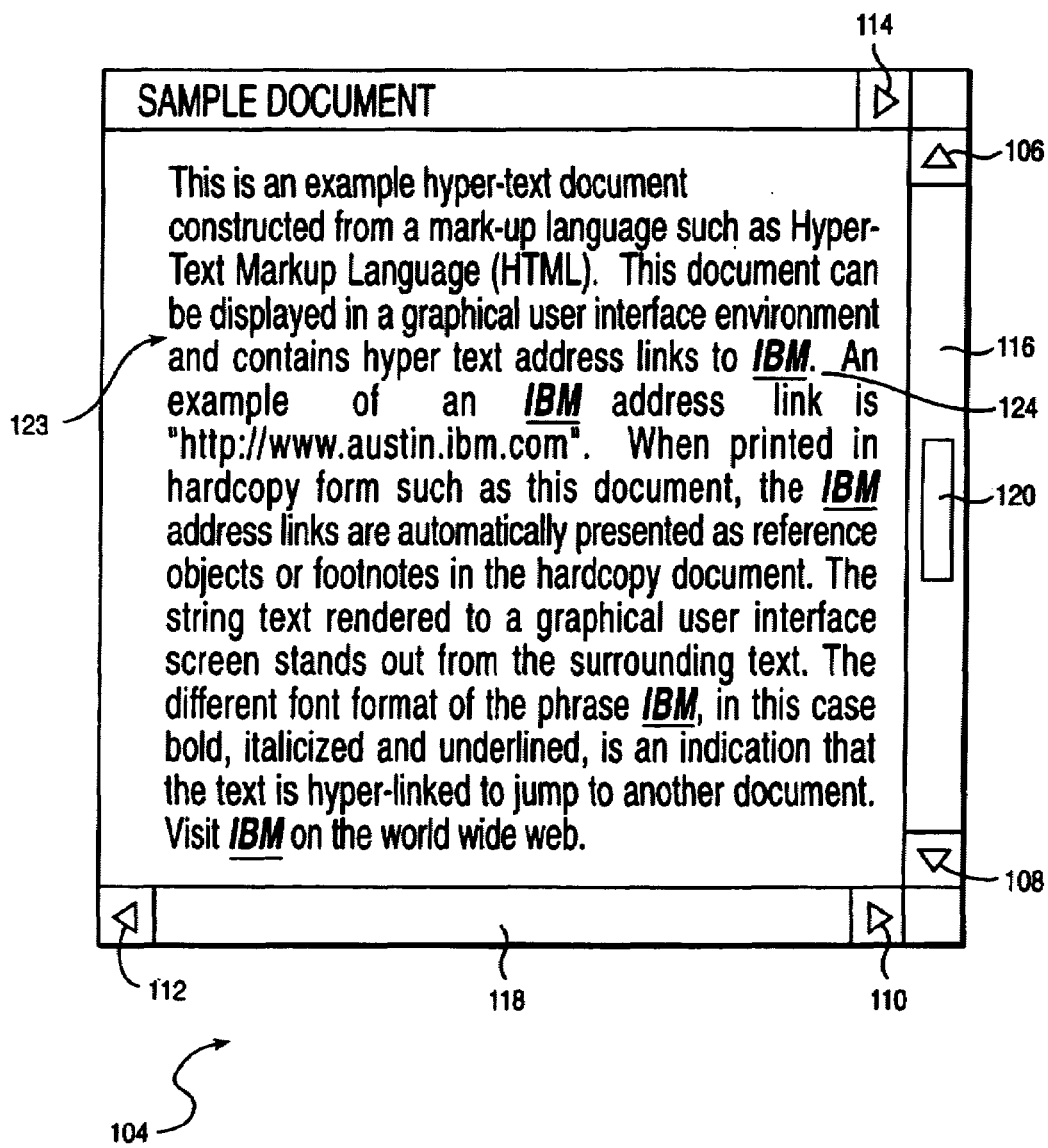
FIG. 6 is a diagram illustrating an example of a hypertext document contained within a graphical user interface window that can be used in accordance with a preferred embodiment of the present invention.

Reference now being made FIG. 6, a diagram is shown illustrating an example of a hypertext document 123 contained within a graphical user interface window 104, which can be used in accordance with a preferred embodiment of the present invention. Note that a graphical user interface is a type of display format that enables the user to choose commands, start programs, and see lists of files and other options by pointing to pictorial representations (i.e., icons) and lists of menu items on the screen (i.e., monitor screen).

Choices can generally be activated with a keyboard or a mouse. Window 104 displays a portion of a viewable object (i.e., hypertext document 123) constructed from a markup language. One such markup language that can be used in accordance with the example presented in FIG. 6, is the Hypertext Markup Language (HTML).

In similarity to other type window environments, the size and position of elevator 120 within scroll bar 116 corresponds to the size and position of the current viewable page in relation to hypertext document 123. Hypertext document 123 can be accessed from a computer system contained within a computer network such as the Internet.

In the example of FIG. 6, because hypertext document 123 includes too many pages to view simultaneously, the user can position a mouse cursor over up-arrow section 106 or down-arrow section 108 of scroll bar 116, and click a pointing device (e.g., a mouse) to scroll the hypertext document 123 upward or downward, as appropriate. A vertical scroll bar 118 includes arrow sections 112 and 110 for scrolling the hypertext document 123 left or right, respectively. Also, an optional arrow section 114 allows a user to scroll the document right.

Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as <u>IBM</u>. The different font format of string text 124 is an indication that the text is hyper-linked to "jump" to another document. When a user clicks on string text 124 with a mouse or other pointing device, the graphical user interface shifts the presently viewed hypertext document 123 to another hyper-linked document.

Figure 7A:
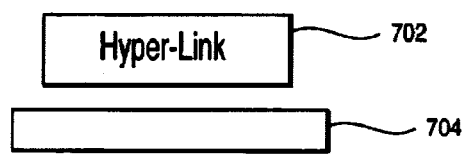
FIG. 7 is a diagram illustrating the string text (hyper-link) of FIG. 6 in greater detail according to the teachings of the present invention.

Reference now being made to FIG. 7, a diagram is shown illustrating the string text (hyper-link) 124 in greater detail according to the teachings of the present invention. More specifically, hyper-link 702 and an additional visual indicator 704 are shown exclusive of the web page (hyper text document) in which they would normally reside, in order to better explain the many advantages of the present invention.

In the preferred embodiment of the present invention, the hyper-link 702 can be drawn so as to visually indicate to the user that the hyper-link is linked within the current page, other pages within the same site, pages external to the current site, links that open a new browser, links that alter the content of the browser, links previously viewed, or links that are slow. Specifically, the hyper-link 702 can be color coded (e.g. green for internal and blue for external), or appearance (e.g. font) changed in order to indicate whether the hyper-link is internal, linked within the same page, or external to the site.

Figure 7B:
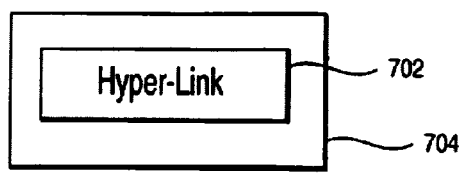

In alternative preferred embodiment of the present invention, the hyper-link 702 is accompanied by a visual indicator 704. The purpose of the visual indicator 704 is to visually indicate whether the corresponding hyper-link 702 is within the current page, other pages within the same site, pages external to the current site, links that open a new browser, links that alter the content of the browser, links previously viewed, or links that are slow. The visual indicator 704 can take various shapes, colors and or forms in order to relay this visual indication to the end user. In an example, the visual indicator 704 can be of varying colors, fonts, shapes, etc. In this yet a further example of the above, visual indicator 704 is shown in FIG. 7B as surrounding the hyper-link 702.

Although illustrative embodiments of the present invention and its advantages have been described in detail herein above, it has been described as example and not as limitation. Various changes, substitutions and alterations can be made in the illustrative embodiment without departing from the breadth, scope and spirit of the present inventions. The breadth, scope and spirit of the present inventions should not be limited by the illustrative embodiment, but should be defined only in accordance with the following claims and equivalents thereof.

What is claimed is:

1. A method of visually indicating the type of action associated with a hyper-link located within a HTML page, the method comprising the steps of selecting a set of actions associated with hyper-links; altering the appearance of the hyperlink to indicate the action associated with the hyperlink belongs to the selected set of actions wherein said selecting step includes the steps of:

selecting hyper-links that invoke a new web browser in response to their activation;

selecting hyper-links that alter the contents of the web browser in response to their activation;

selecting hyper-links that are linked to previously viewed web pages; and selecting hyper-links that are linked to web pages which have a transmission rate lower than a pre-selected value.

2. The method of claim 1 wherein the selected hyper-links are color coded according to the type of action that occurs during their activation.

3. An apparatus for visually indicating to a user the type of action associated with a hyperlink located within an HTML page, the apparatus comprising means for selecting a set of actions associated with hyperlinks, means for assigning a unique appearance characteristic to each selected action and means for correspondingly altering the appearance of the hyperlink to indicate the action associated with the hyperlink belongs to the selected set of actions; wherein the means for selecting includes:

means for selecting hyper-links that invoke a new web browser in response to their activation;

means for selecting hyperlinks that alter the contents of the web browser in response to their activation;

means for selecting hyper-links that are linked to previously viewed web pages; and means for selecting hyper-links that are linked to web pages which have a transmission rate lower than a pre-selected value.

4. The apparatus of claim 3 wherein the selected hyperlinks are color coded according to the type of action that occurs during their activation.

* * * * *